(12) United States Patent
Miller

(10) Patent No.: US 9,651,396 B1
(45) Date of Patent: May 16, 2017

(54) LOGISTIC DISCOUNTING OF POINT OF INTEREST RELEVANCE BASED ON MAP VIEWPORT

(71) Applicant: A9.com, Inc., Palo Alto, CA (US)

(72) Inventor: Gregory Scott Miller, Mountain View, CA (US)

(73) Assignee: A9.com, Inc., Palo Alto, CA (US)

( * ) Notice: Subject to any disclaimer, the term of this patent is extended or adjusted under 35 U.S.C. 154(b) by 120 days.

(21) Appl. No.: 14/668,737

(22) Filed: Mar. 25, 2015

(51) Int. Cl.
*G01C 21/34* (2006.01)
*G01C 21/36* (2006.01)

(52) U.S. Cl.
CPC ..... *G01C 21/3667* (2013.01); *G01C 21/3679* (2013.01); *G01C 21/3682* (2013.01)

(58) Field of Classification Search
CPC .................. G01C 21/3679; G01C 21/3682
See application file for complete search history.

(56) References Cited

U.S. PATENT DOCUMENTS

| | | | |
|---|---|---|---|
| 8,458,173 B2* | 6/2013 | Laurenzo | G01C 21/32 707/723 |
| 8,810,437 B2* | 8/2014 | Beyeler | G01C 21/3682 340/995.1 |
| 9,275,154 B2* | 3/2016 | Myllymaki | G01C 21/3682 |
| 2015/0192419 A1* | 7/2015 | Jiang | G01C 21/3682 701/408 |

* cited by examiner

*Primary Examiner* — Todd Melton
(74) *Attorney, Agent, or Firm* — Hogan Lovells US LLP

(57) ABSTRACT

The subject technology provides embodiments for a relevance ranking algorithm of point of interests (POIs). Based on a query request from a user of a mapping application, the relevance ranking orders the matching POIs based on either a reverse logistic distance function or a logarithmic distance function that is used as a multiplier for a baseline score of each of the matching POIs. The multiplier is used to boost or discount the respective relevance of each of the matching POIs, especially with respect to a specified area of interest included in the query request or a location of a user included in the query request. A subset of the ranked POIs may then be selected for display to the user.

20 Claims, 8 Drawing Sheets

LOGISTIC DISCOUNTING OF POINT OF INTEREST RELEVANCE BASED ON MAP VIEWPORT

BACKGROUND

Many people utilize computer-based mapping applications to obtain the locations of, and directions to, various locations, as well as to locate places near a current or specific location. A person wanting to perform such a task typically opens an application, inputs the necessary information (such as a location or point of interest) and receives location information, driving directions, nearby points of interest (POI) as determined by the mapping application provider, and other such information.

BRIEF DESCRIPTION OF THE DRAWINGS

Various embodiments in accordance with the present disclosure will be described with reference to the drawings, in which.

DETAILED DESCRIPTION

Figure 1A:
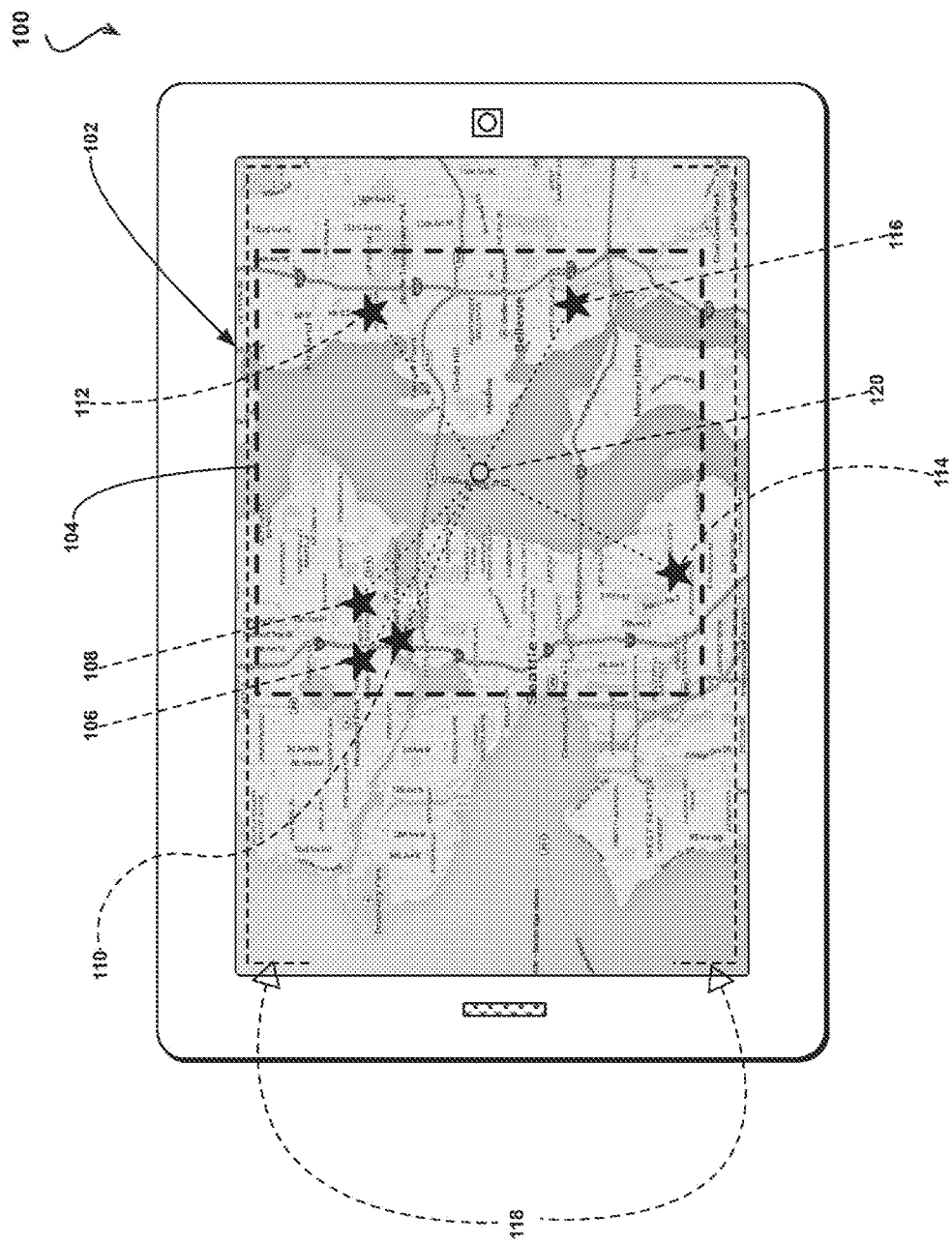
FIG. 1A illustrates an example interface display of a computing device that can be presented to a user in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Interactive geographic maps, e.g., maps provided by a mapping service or computing device running a mapping application, can provide a visual representation of a geographic region. An interactive geographic map for a particular geographic region can also describe various features that appear in the particular geographic region. For example, an interactive geographic map can provide point of interest information (POI) in response to a request from a user. A point of interest (POI) as used herein may be a specific physical place that is of interest to a general population. The POI may be attached to a street address, latitude and longitude coordinates, and/or other location identifiers. Additionally, databases of POIs may be available from data providers. A POI database, in an embodiment, may include information aggregated from one or more sources (other POI databases, social networks, electronic commerce sites, other web sites, APIs accessing other or third party POI information, etc.), which may include information such as name, address, phone number, metadata describing the POI, etc. Additionally, the content in the POI database(s) may be organized according to category and/or geographic location.

Embodiments described herein relate to searching various POIs (among other types of information) within a geographical location based on position information provided by a user of computing device that accesses a mapping application or mapping service. In additional to search query terms, a search request may include other parameters including constraints such as query field constraints (e.g., a query can specify constraints on business category, brands sold and product types sold, etc.), bounding box constraint (e.g., a query may specify a latitude and longitude bounding box as a constraint), and/or a user location (e.g., latitude and longitude coordinates may be provided specifying the location of the user). POIs may be ranked (e.g., given a score) in accordance to ranking algorithms described further herein for providing the user with POI information based on the user's search criteria. In some existing POI ranking algorithms, a linear or logarithmic distance function may be used with respect to scoring POIs. However, a linear distance function may rank a POI lower in a linear fashion as distance increases (where a score could eventually be zero and be truncated to zero after determining negative scores), and a logarithmic algorithm may rank a POI less relevant quickly (e.g., lowering the score rapidly) as distance increases but slows down decreasing scores as distance further increases and approaches zero for the scores.

However, ranking POI information according to a specified geographical region (e.g., a bounding box, or specified radius around a location), or within a viewport of a user's computing device, such that POIs within such a region or viewport are ranked substantially equally (and subsequently provided to user in the rendered map) is not accomplished by the aforementioned linear or logarithmic distance functions. This may be advantageous as POIs that are discounted (or considered less relevant) when located beyond a distance threshold from a given location (e.g., user's location) may still be considered a relevant POI to provide to a user (e.g., when included within the boundaries of a bounding box or distance radius). As used herein, viewport refers to a display that the user will view a rendered map image based at least in part on mapping information, including POI information. A viewport, when not explicitly specified, may be a size of a screen of a computing device. In some cases, however, the viewport may not be necessarily limited to the screen's physical size. As an example, when the device includes scrolling functionality in a graphical interface, a (logical) size of the viewport may exceed the screen's physical size. In another example, a size of the viewport may be smaller than the screen's physical size and could be specified by the user (e.g., for specifying a bounding box representing an area of interest in a map).

As an example, a user may access a mapping application and enter one or more search terms for locations or POIs that the user would like to locate using the mapping application. In response to the user submitting a request to perform a search for POI information, mapping information may be determined based at least in part on one or more parameters in the request, either locally on the device or through a mapping service, or a combination thereof.

FIG. 1A illustrates an example interface display 100 of a computing device that can be presented to a user in accordance with various embodiments. In response to the request, the application on the client device can cause an interface state 102 to be displayed by the computing device, as illustrated in FIG. 1A, which includes a view of a geographic region at least within a specified zoom level or level of detail, among other such options, as well as any surrounding roads, buildings, bridges, railways, bodies of water, etc., that are provided at the zoom level or level of detail. The view can also include one or more points of interest 106, 108, 110, 112, 114, and 116 that might be selected for display to the user as discussed herein. FIG. 1A will be discussed below with reference to FIG. 1B to facilitate discussion of the examples.

In an embodiment, in addition to query search terms (e.g., keywords), a mapping service can analyze the request to determine whether viewport information and/or a bounding box information (e.g., an area of interest) are also included as additional parameters in the request, which may be subsequently used to filter or select POI information returned as results from the query. A given request, in an embodiment, may include the following parameters:

Query keywords: a query may contain a keyword string. This is the raw text string provided by the user.

Query field constraints: a query may contain one or more constraints. A query can specify constraints on business category, brands sold and product types sold.

Bounding box constraint: a query may specify a bounding box defined in latitude and longitude coordinates as a constraint.

Preferred bounding box: a query may specify a bounding box defined in latitude and longitude coordinates as a preference for results. Results inside this area are preferred over results outside.

User location: latitude and longitude coordinates may be provided specifying the location of the user.

Any input constraints (e.g., field or bounding box) may not be used for ranking in an embodiment, but will be used to constrain or filter the matching POI results. In the example of FIG. 1A, the request includes a bounding box parameter which corresponds to a bounding box 104 illustrated in the interface 102. The bounding box 104 may not be displayed in the interface 102 and is included in FIG. 1A for the purpose of facilitating the description of the example.

In the example of FIG. 1A, a query request searching for stores within the bounding box 104. As further shown in a query request and results example 150 of FIG. 1B, a query 160 including parameters for query keyword ("Foo Store"), viewport coordinates (e.g., bounding box coordinates including 2 respective latitude and longitude coordinate pairs that each represent an opposite corner of the bounding box), and user location coordinates (e.g., latitude and longitude coordinates). The mapping service may process the query request and generate the following information with respect to each result corresponding to a POI included in the mapping information.

First, a match score or quality (e.g., "_score" or "mq(q,d)" as discussed further herein) may be determined as a baseline score for matching the query to a POI. The match score, in an example, will be a real-valued, non-negative number that will indicate how similar the query is to a POI (e.g., the higher the better or more relevant). In an embodiment, the match score is a function of both the query and a specific document. For example, a score of 0.0 will indicate that there is no similarity, while a positive score indicates a some amount of similarity that grows monotonically. The other functions (e.g., locality quality lq and intrinsic quality iq described further below) can serve to either boost or discount this baseline score. The match score may have the following properties:

1) Similarity between a POI and the query is assessed on a per-field basis. The per-field similarity scores are added to get the final score. A "boost" multiplier value can be configured for each field and will be applied when summing the scores. This value may be initially set to 1 for all fields to treat them equally. For example, if a query specifies a disjunction between a name and category, there will be some similarity score generated representing how well the name portion matches the name field in each document, and the same for category. These two scores will be summed to get the final baseline score. In an embodiment, the "boost" multiplier may be set dynamically at query time based on where the input feature came from (e.g., an explicit condition from the user may want to boost higher than one derived from query parsing).
2) The baseline score increases proportionally with respect to the frequency of each term in the query field. The growth or increase is considered sub-linear, which means that the score will be higher for a field containing a query term multiple times. In an example, this may apply to a name of a business.
3) The score is discounted proportionally to the document-frequency of each term, again in a sub-linear fashion, which means that terms or IDs that occur in fewer documents will be deemed more important. This may apply to both text fields and literal fields (e.g., IDs).
4) The score is discounted proportionally to the length of each field. This may effect the business name, and longer business names may have a slight negative impact on score.

Further, a locality quality (e.g., distance score or "lq(q,d)" function or distance function as discussed further herein) may also be used. In an embodiment, a value generated from the locality or distance function will also be real-valued and will range from (0,m], where m is constant. Values larger than 1 will serve to boost the baseline score, while values between 0 and 1 will serve to discount the baseline score. The value of m mentioned above can be tuned based on how "important" that a value of the locality quality with respect to affecting a value of the final score of a POI.

In some embodiments, an intrinsic quality (e.g., "ig(d)" function) may also be used. Similar to the locality quality lq(q,d), the value generated by an intrinsic quality function will be real valued and will range from (0, n], where n is constant. As with the locality quality lq, values larger than 1 will boost the score, while values less than 1 will discount it. Similarly, the value of n mentioned above can be tuned based on how "important" the value of the intrinsic quality of a POI with respect to effecting a value of the final score of a POI.

Additionally, a "raw" distance (e.g., "raw distance" or "rd(q,d)" as described further herein) may be used in conjunction with determining the distance functions described herein. In an example, a raw distance represents a measure of distance between a given POI's point location and the query location. The query location can either be the provided point (e.g., geographical coordinates) or the center of the provided viewport or area of interest. In an example, this distance is measured in kilometers and based on an as-the-crow-flies technique (e.g., the shortest distance between two points such as on a map, disregarding intervening terrain or the geodesic distance).

For matching with the query, information for each POI may include the following:

- Business name: the name of the business will be available as a text string.
- Business location: a point location will be available for the business.
- Brands: a list of brand IDs that the business is known to sell.
- Product Types: a list of product type IDs that the business is known to sell.
- Categories: a list of category IDs the business has been classified as.
- Average rating: the average star rating the business has received from users. This is real-valued and ranges from [0-5].
- Number of reviews: the number of reviews customers have given to the business. This may be the denominator in the average rating feature, and is an non-negative integer value in an example.
- Data completeness: additional data that the business owners can provide for POI information: open hours, payment methods accepted, description and image.

Figure 1B:
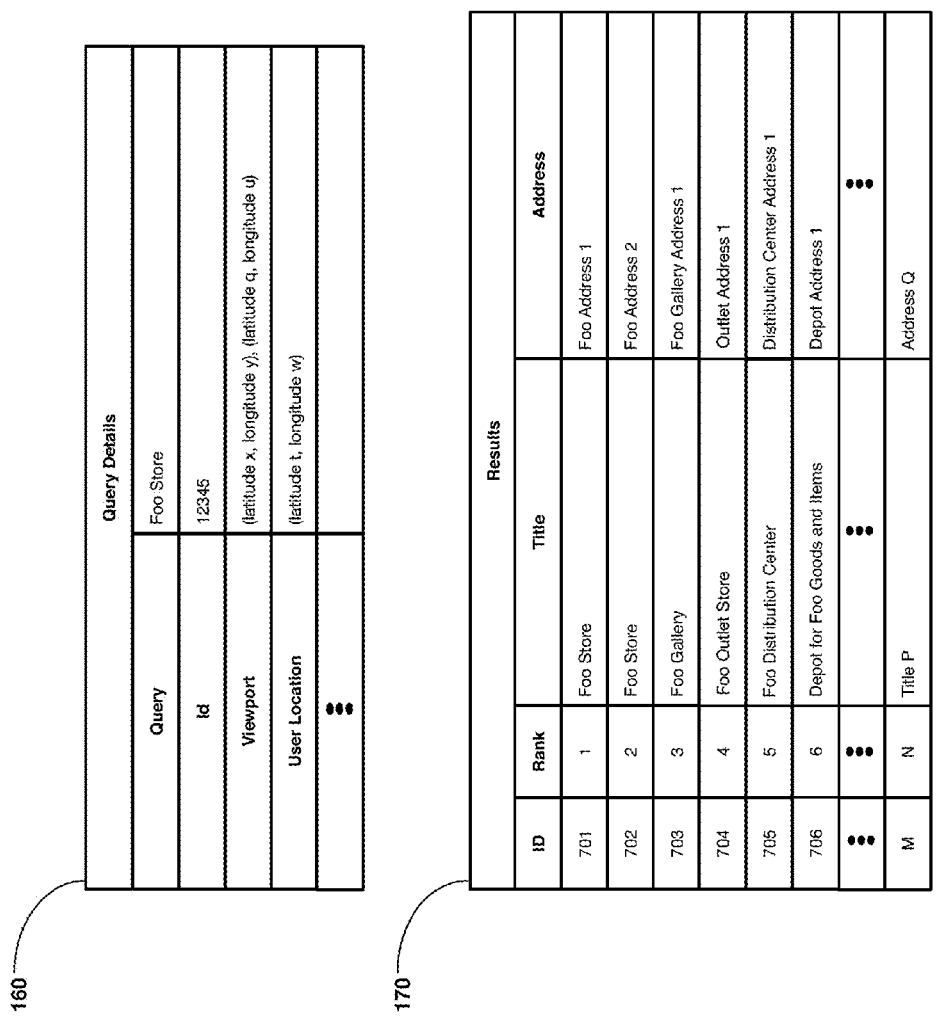
FIG. 1B illustrates example information included in a query and corresponding query results in accordance with various embodiments.

The results of the query search include information corresponding to the points of interest 106, 108, 110, 112, 114, and 116, each within the bounding box 104, that are selected for display to the user. The mapping service or application may rank query results 170 as shown in FIG. 1B in accordance with logistic distance function as described further herein. The query results 170 may include information such as ID information, a ranking within a query result set (e.g., the query results 170), a title or name associated with a business or POI, and an address. It is appreciated that fewer or more information may be provided with a given query result. In this example, a query result corresponding to "Foo Outlet Store" may be ranked lower than the respective query results for "Foo Store" since one-third of the terms in "Foo Outlet Store" do not match the search query for "Foo Store" and the result for "Foo Outlet Store" is penalized or scored lower as a result. Similarly, the query result for "Foo Gallery" may be ranked lower since one term does not match the search query "Foo Store" and would be ranked lower than the respective matching search results for "Foo Store" as illustrated in FIG. 1B.

For a query with a viewport (e.g., either explicitly provided as included in the query request or derived from query parsing), embodiments herein may use a logistic function derived from the viewport radius to rank POI results and subsequently select a portion of the POI results for display. In this manner, results within the viewport are substantially equally relevant in terms of distance, become less relevant along the border for the viewport, and then are mostly irrelevant (e.g., low score) outside of the viewport. This logistic function may not do much to reorder results that are within the viewport or outside the viewport, but will separate the results within the viewport from those outside the viewport. By analogy, this is a similar concept to separating positive and negative examples when doing logistic regression.

The mapping service may select a portion (or all) of the query results 170 for display to the user in the interface 102. In FIG. 1A, each respective query result from the query results 170 in FIG. 1B, corresponding to the points of interests 106, 108, 110, 112, 114, and 116 that are located within the bounding box 104, are selected for display. In an embodiment, respective raw distances from each of the points of interests 106, 108, 110, 112, 114, and 116, may be determined from a center point 120 of the bounding box 104, which are each used to determine respective distance scores in accordance to the logistic distance function as described further herein. Also note, in the example of FIG. 1A, query results corresponding to POIs outside of the bounding box 104, as indicated by a region 118, are not selected for display in the interface 102 based on the results of the logistic distance function, which may rank POIs substantially with the same relevance within some distance radius r1 (e.g., within the bounding box 104), then from r1 to another distance radius r2 (e.g., some distance outside of the bounding box 104), transition from relevant to less relevant (controlled by a parameter or coefficient), then from distance r2 to infinity, have low relevancy. The ranges of distances for distances r1 and r2 can be set based on input signals such as the size of the viewport in an embodiment. It is appreciated that the region 118, although depicted as dashed lines for the purpose of discussion in FIG. 1A, may not be displayed by the mapping application in the interface 102.

Although the example in FIG. 1A includes points of interests that are within the bounding box 104, it is appreciated that embodiments of the subject technology may provide points of interests outside of the bounding box 104. For example, in an embodiment where a query request indicates that the top ten results (e.g., POIs with the top ten highest scores or rank) are desired, and only five POI results are matched within a given area of interest or bounding box, then additional results may be provided that are outside of the area of interest. In another example, if a POI result is outside of a given area of interest, and has a score that is substantially greater (e.g., by some threshold amount of percentage) than in comparison to the POI result(s) in the area of interest, the outside POI result may be provided.

Figure 2:
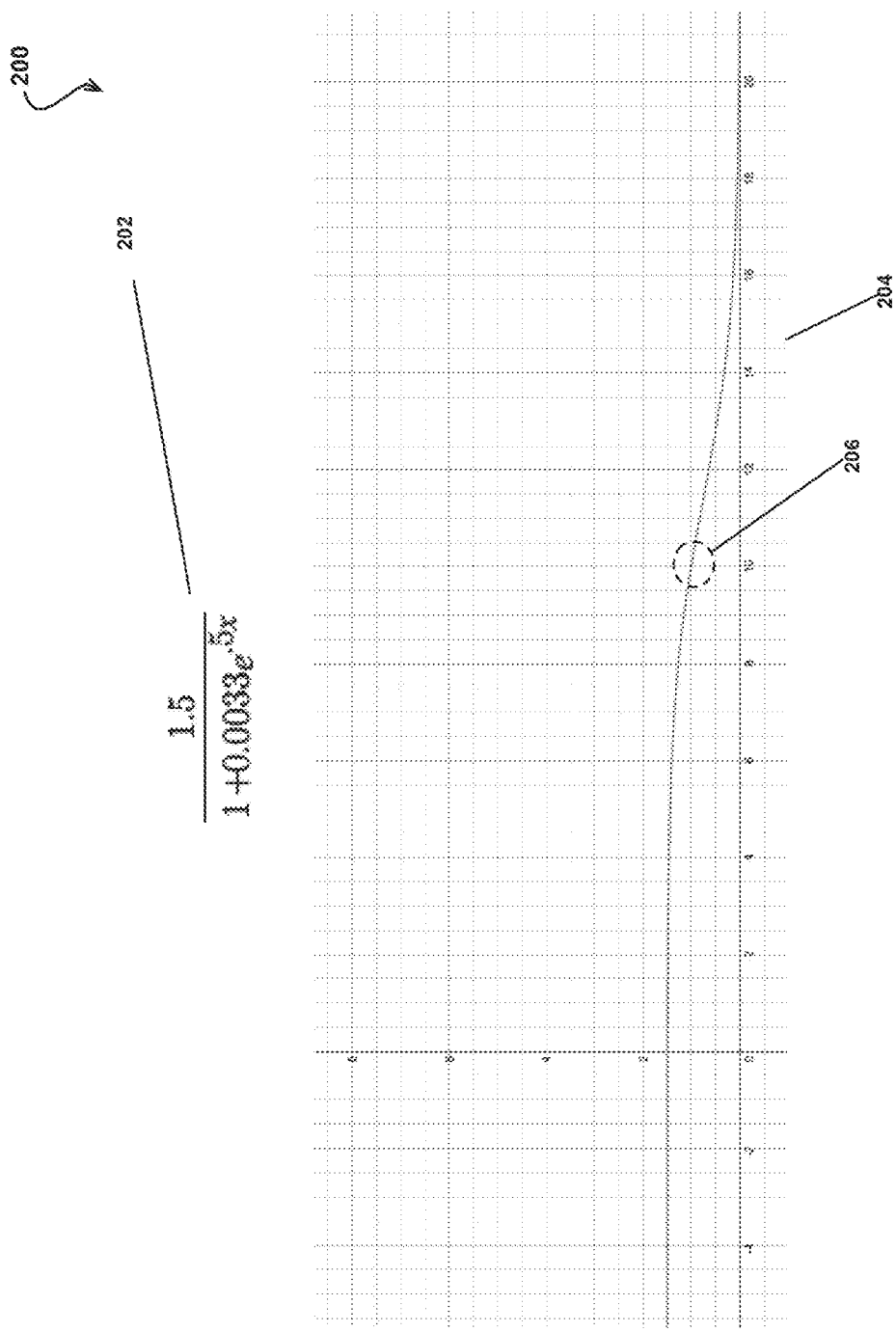
FIG. 2 illustrates an example visualization for a logistic function (e.g., reverse logistic function) as described above in FIGS. 1A and 1B, in accordance with some embodiments of the subject technology.

FIG. 2 illustrates an example visualization for a logistic function (e.g., reverse logistic function) as described above in FIGS. 1A and 1B, in accordance with some embodiments of the subject technology.

In an embodiment, a logistic distance function may take the following mathematical form:

$$f(d) = \frac{\text{max\_boost}}{1 + \theta_0 \cdot e^{\theta_1 \cdot d}}$$

This is a logistic distance function that takes on values from (0,m], as described before. In example, the function holds a fairly steady, slowly decreasing value near m (e.g., the max_boost value above), before quickly falling off and then transitioning again to an almost steady state of slowly decreasing towards zero. A quick-falloff area is positioned near the boarder of the user's area of interest (e.g., the viewport or bounding box). This will have the effect of separating documents within the area from those outside, and is very similar to that in logistic regression, where a similar curve is used to separate confidently positive results from confidently negative results, and those with less certainty. To draw an analogy, this curve will separate POIs that are highly likely to have a strong locality quality from those that do not have such a quality, and leave an area of "uncertainty" in the middle. The two theta parameters can be set to position the area of fast-falloff and the shape of that falloff.

The example of FIG. 2 includes a graphing function 202 which includes representative values for the above logistic function. A graph 204 represent a curve for the logistic function in which the x-axis represents distance in kilometers and the y-axis represents a distance score (e.g., multiplier) for the baseline score associated with a POI at a distance along the x-axis. The max_boost parameter represents a value of an upper bound or maximum value (e.g., 1.5 when the denominator resolves to 1 for the graphing function 202) for multiplying the baseline score. The variable e in the above function represents a mathematical constant that is the base of the natural logarithm, which is approximately equal to 2.71828. The variable e is also called Napier's constant. The variable d in the exponent of the above function represents a raw measure of distance between the location of the POI and the query location (e.g., as provided as a location of a user or the center of the provided viewport). As mentioned before, this "raw" distance may be measured in kilometers and based on an as-the-crow-flies technique (e.g., the shortest distance between two points such as on a map, disregarding intervening terrain; the geodesic distance). In the graphing function 202, the value of 0.0033 for $\theta_0$ can be based on the radius of the query (or other desired distance for applying the distance function), and in this case it intersects 206 with the value of 1 on the y-axis when x has a value of 10 (e.g., 10 km). As an example, when the value of 0.0033 is increased, the value along the x-axis decreases where it intersects with the value of 1 on the y-axis, and when the value of 0.0033 is decreased, the value along the x-axis increases where it intersects with the value of 1 on the y-axis.

The $\theta_0$ (e.g., "theta-zero") can be set such that the distance function f(d) can equal the value of 1 at a specific value of d, while $\theta_1$ (e.g., "theta-one") controls how quickly the value degrades from ~max_boost to ~0. The 0.5 (representing $\theta_1$) therefore determines how in the exponent of variable e determines how quickly the graph 204 falls (e.g., decreases) as the value along the x-axis increases after intersecting the y-axis at 1. Further, the $\theta_0$ in the formula above can be set according to a desired radius or distance using the following formula:

$$\theta_0 = \frac{max\_boost - 1}{e^{\theta_1 \cdot radius}}$$

In one embodiment, a final score for a POI may be determined using the following:

relevance=f(d)·_score where _score represents the baseline score (e.g., the match score) determined as described above and f(d) is result of the distance function described above.

Figure 3:
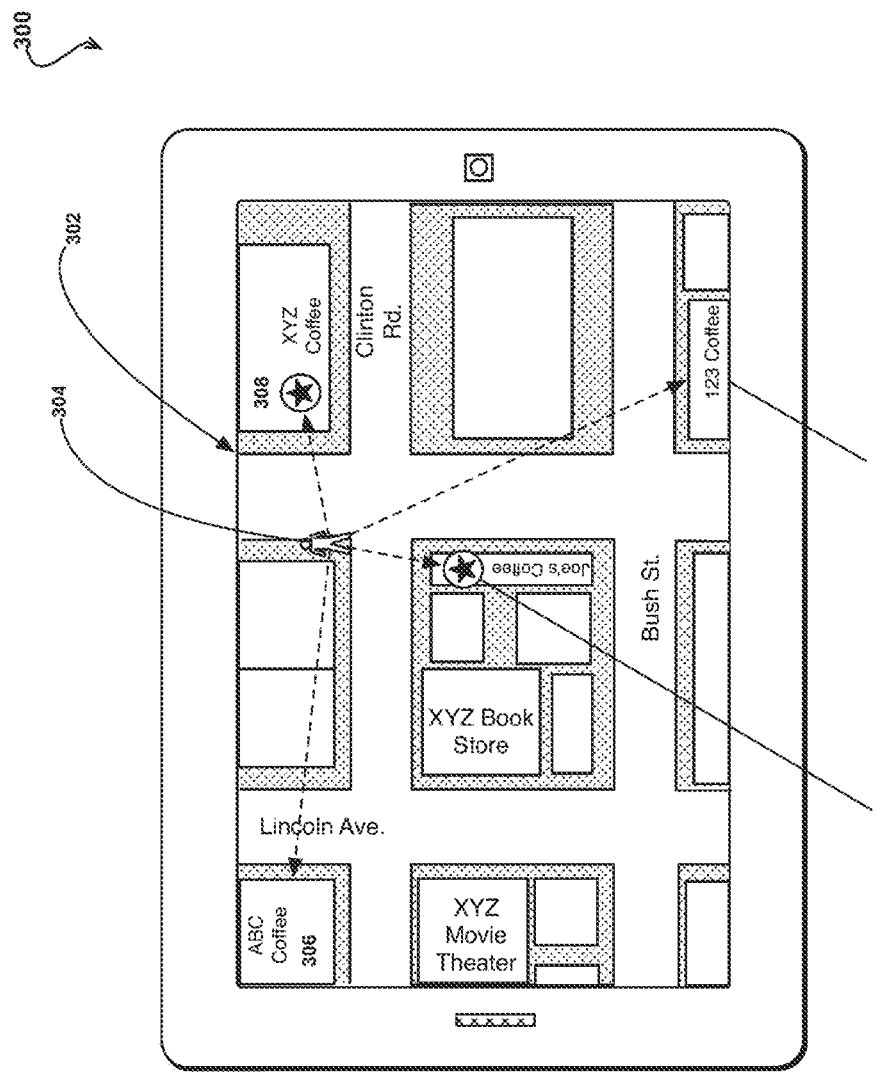
FIG. 3 illustrates an example interface display of a computing device that can be presented to a user in accordance with various embodiments.

FIG. 3 illustrates an example interface display 300 of a computing device that can be presented to a user in accordance with various embodiments. In response to a query request, the application on the client device can cause an interface state 302 to be displayed by the computing device, as illustrated in FIG. 3, which includes a view of a geographic region at least within a specified zoom level or level of detail, among other such options, as well as any surrounding roads, buildings, bridges, railways, bodies of water, etc., that are provided at the zoom level or level of detail. The view can also include one or more points of interest 306, 308, 310, and 312 that might be selected for display to the user as discussed herein.

For a query with a provided point location (e.g., a user's location or a selected location for the purpose of the query), but without viewport information included in the query (and assuming that a location is not determined from query parsing), a logarithmic distance function may be used. With a location included in the request, a user is assumed to be querying for POI results nearby the provided location. Thus, POI results that are close by will be strongly favored or considered more relevant, and the relevance of other results will be quickly discounted as these further POI results are further away, and subsequently discount, at a slower rate, the even further results that may be found.

In the example of FIG. 3, a location 304 of a user is graphically represented in the interface 302. The query in this example may be for "coffee" from the user's location 304. However, in this example, information regarding a bounding box constraint or viewport information (e.g., an area of interest) is not included in the query request. Thus, POI results that are close by the location 304 of the user will be considered more relevant than POI results that are further away from the location 304.

In FIG. 3, the POI 308 and POI 310 may included for display in the interface 302 as each of these POIs are closer in distance to the location 304 of the user. In comparison, POIs for a location 306 ("ABC Coffee") and a location 312 ("123 Coffee") may not be provided for display as the distances from the user goes beyond a certain distance are consequently discounted.

In an embodiment, a logarithmic distance function may be used a multiplier for boosting or discounting baseline scores for POIs, which may be represented by the following mathematical notation:

$$f(d) = \frac{max\_boost}{1 + \ln(1 + \theta + d)}$$

wherein max_boost is the constant representing a upper bound or maximum for the multiplier, ln is a natural log, theta $\theta$ parameter defines the shape of a falloff, and d represents the raw distance value of a POI as discussed before.

The above logarithmic distance function will take on values from (0,m], as described before, and will decrease from m (e.g., the max_boost parameter in the above function) towards zero in a logarithmic way as distance increases. Thus, the function will quickly shrink in value at first, and then decrease more slowly. The implication is that the user would much prefer results that are very close, but at some point the different in distance becomes less and less important. As mentioned above, the theta parameter can be used to define the shape of this falloff.

Figure 4:
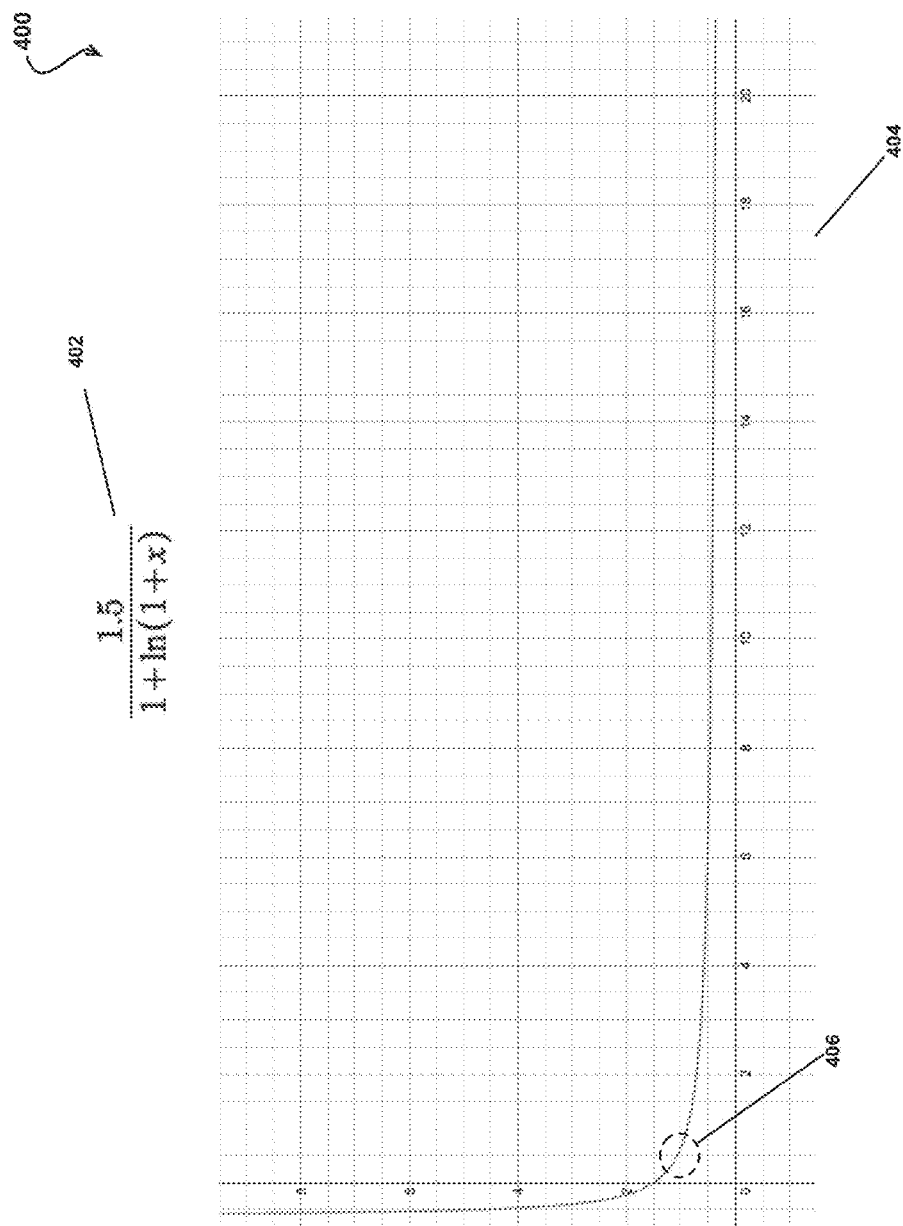
FIG. 4 illustrates an example visualization for a function (e.g., logarithmic function) as described above in FIG. 3, in accordance with some embodiments of the subject technology.

FIG. 4 illustrates an example visualization for a function (e.g., logarithmic function) as described above in FIG. 3, in accordance with some embodiments of the subject technology.

In the example of FIG. 4, a logarithmic distance function 402 with max_boost with a value of 1.5 and theta $\theta$ has a value of 1. The y axis of graph 404 represents values of a distance function lq(q,d) and the x axis represents distance values in kilometers. At an intersection 406 where the distance has a value of 0.5 km, the value of the y-axis may be 1 such that a POI at a distance of 0.5 km will not have its baseline score changed by the distance score multiplier. Further out than 0.5 km, the distance function multiplier will decrease more until reach a distance point where the drop-off in the multiplier value on the y-axis reaches a level where it settles or substantially plateaus.

Figure 5:
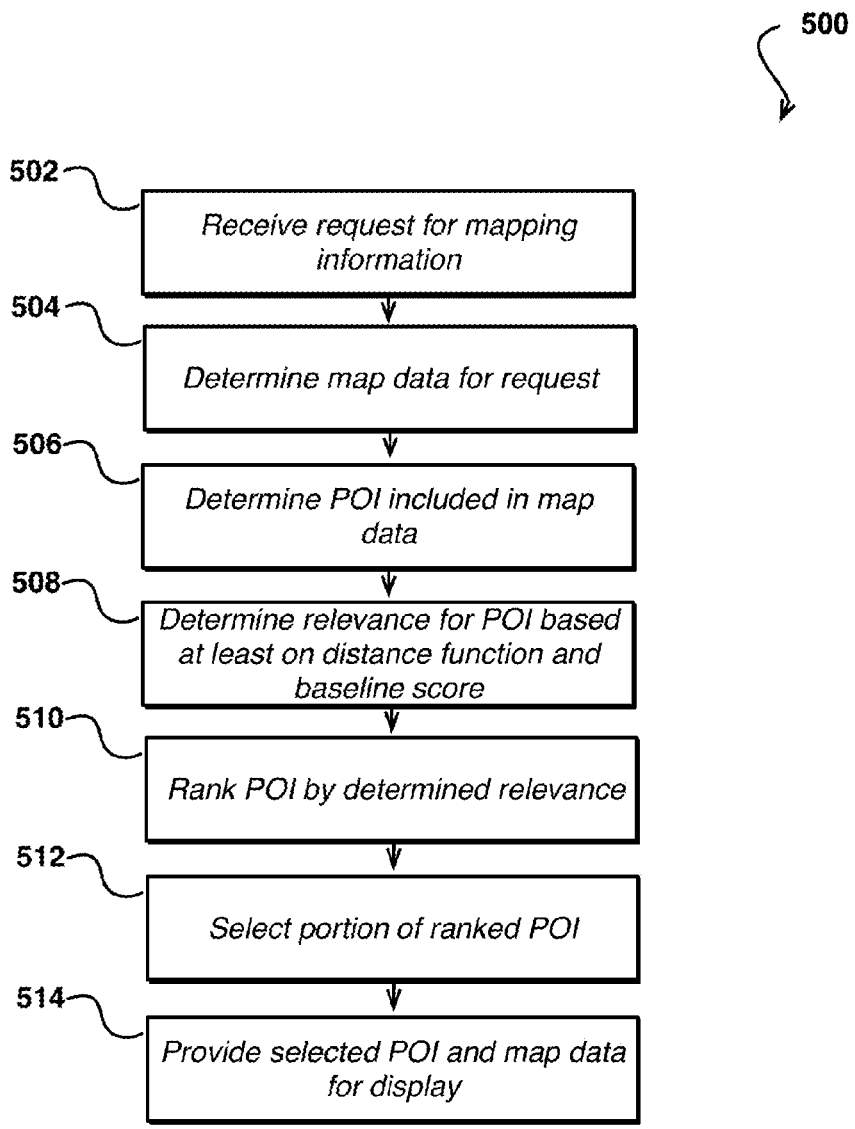
FIG. 5 illustrates an example process for providing mapping information for points of interests that can be used in accordance with various embodiments.

FIG. 5 illustrates an example process 500 for providing mapping information for points of interests that can be used in accordance with various embodiments. Although this figure, as well as other process illustrations contained in this disclosure may depict functional steps in a particular sequence, the processes are not necessarily limited to the particular order or steps illustrated. One skilled in the art will appreciate that the various steps portrayed in this or other figures can be changed, rearranged, performed in parallel or adapted in various ways. Furthermore, it is to be understood that certain steps or sequences of steps can be added to or omitted from the process, without departing from the scope of the various embodiments. The process 500 may be implemented by one or more computing devices or systems in some embodiments.

At step 502, a request is received from mapping information from a user of a mapping application executing on a client device. At step 504, mapping data corresponding to at least one geographic region derived at least in part from information in the request is determined. The mapping data includes at least graphical information for rendering a map display for the at least one geographic region. At step 506, based at least in part upon the at least one geographic region, point of interest (POI) data associated with the mapping data is determined in which the POI data includes one or more POIs.

At step 508, a relevance score of each POI is determined. In an embodiment, the determined relevance score is based on determining a ranking score of each POI based at least in part on a distance function applied to each POI and a baseline score of each POI. In an embodiment, determining the ranking score includes determining that the request includes a specified area of interest, and determining a value of the distance function based on a logistic function, the logistic function using a constant value representing a maximum multiplier value for adjusting the baseline score, a first value that controls the logistic function generating a value of 1 at a specified distance, a second value representing a rate in which the constant value decreases to zero, and a geodesic distance between a first location of each POI and second location within the specified area of interest, the second location comprising a center of the specified area of interest. The determined ranking score of each POI is then determined using the value of the distance function as a multiplier for applying to the baseline score of each POI. In another embodiment, determining the ranking score includes determining that the request does not include the specified area of interest and includes the location of the user, and determining a value of the distance function based on a logarithmic function, the logarithmic function using a natural logarithm applied to a constant value representing a maximum multiplier value for adjusting the baseline score, a first value representing a rate in which the constant value decreases to zero, and a geodesic distance between a first location of the each POI and the location of the user. The ranking score is then determined using the value of the distance function as a multiplier for applying to the baseline score of the each POI.

At step 510, the POIs are ranked in accordance with the determined relevance scores. At step 512, a portion of the ranked POIs are selected. At step 514, the selected POIs are provided for display to the user. In an embodiment, selecting the portion of the POI data includes selecting one or more POIs within an area of interest included in at least one geographic region.

Figure 6:
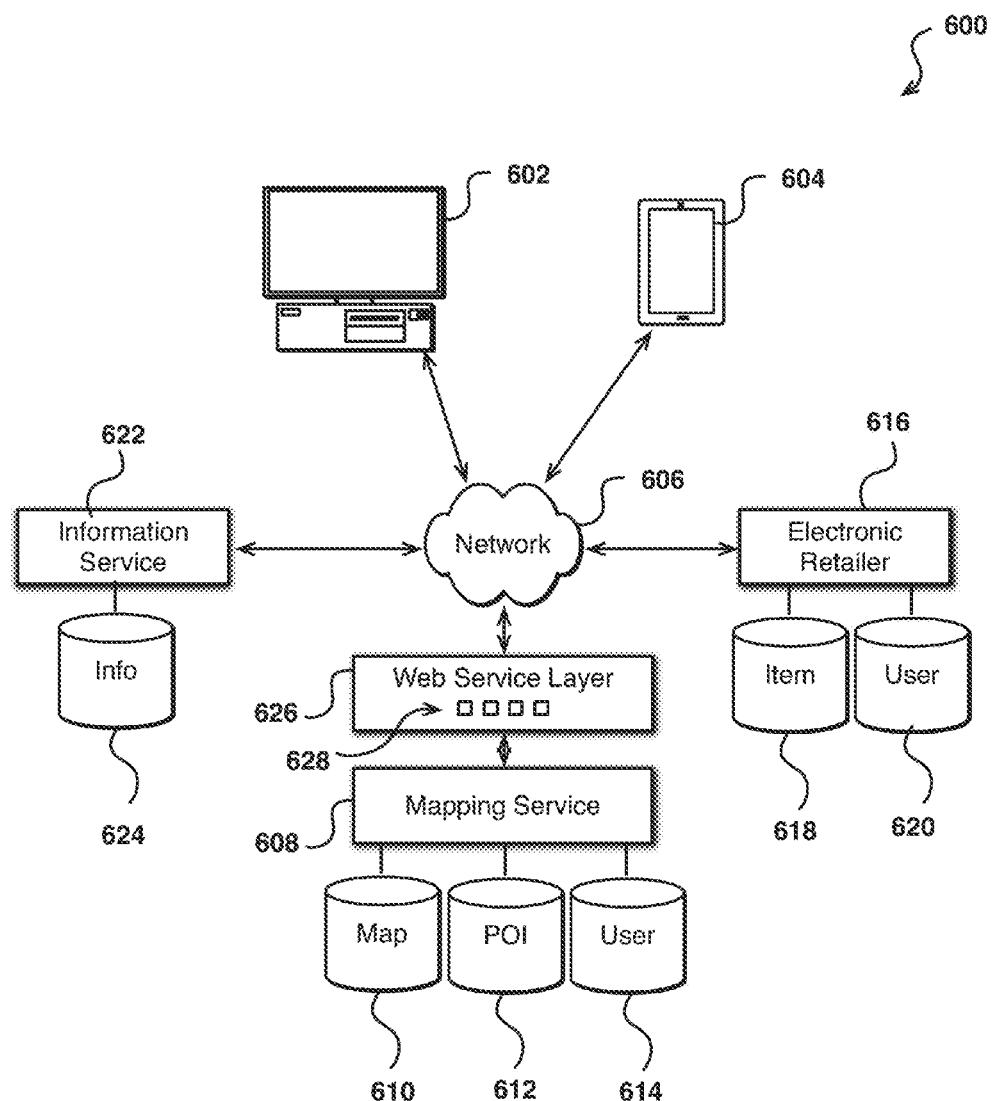
FIG. 6 illustrates an example environment in which a user can obtain mapping information using one or more client devices, in accordance with various embodiments.

FIG. 6 illustrates an example environment 600 in which a user can obtain mapping information using one or more client devices, in accordance with various embodiments. It should be understood that the example system provides a general overview of basic components, and that there can be many additional and/or alternative components utilized as known or used in the art for the generation, transmission, processing, management, and/or storage of electronic information. In this example, a user is able to utilize a client device 602, such as a personal computer, tablet computer, smart phone, and the like, to access a mapping system or service 608 over at least one appropriate network 606, such as a cellular network, the Internet, or another such network for communicating digital information. In some embodiments, a mapping application will be installed on the client device 602, such that much of the planning, information gathering, or other such aspects can be executed on the client device, while the mapping service 608 is contacted primarily to obtain map tiles (e.g., bitmap or vector), point of interest data, and other such information, which the mapping service might pull from a map data store 610, a point of interest (POI) data store, and/or another such location. The determining of routes between two or more locations can be performed on the client device 602, by the mapping service 608, or a combination thereof. Various other interaction and execution approaches can be utilized as well within the scope of the various embodiments.

A user can use one of the client devices 602, 604 to request, through the mapping application (or a mapping Web site, etc.), specific mapping information. The mapping information can include, for example, graphical map tiles that show a map view of a region around an address, road and area identifying information, and various points of interest that might be displayed on a region of the map being displayed by the application. In many cases, the mapping service 608 will pull the map data from a map data store 610 or other such location, and a portion of a default set of POI stored in a POI data store 612, or other such location. The mapping service might also include a user data store 614 for storing preference, account, or other such information for the user. The mapping service can select the data appropriate for the request, and provide the data back over the at least one network 606 to the client device 602 from which the request originated.

As mentioned, the POI data returned from the mapping service can be selected from a default set of POI determined by a provider of the mapping service, or other such entity. This information can be obtained using conventional approaches, such as by accessing publicly accessible data to obtain information about public locations (e.g., parks and government buildings) or major attractions (ball parks, amusement parks, etc.). The mapping service provider can also provide POI for locations corresponding to businesses or locations with which the mapping service has established a business relationship, whether directly or indirectly. For example, the mapping service might display POI for gas stations or restaurant chains that have paid to be included with the POI data.

Systems and methods in accordance with various embodiments, however, can also enable information from other sources to be included as POIs as well. For example, as illustrated in FIG. 6 the mapping system or service can include at least one Web service layer 626, or other such set of components, which can include one or more APIs 628, or other such interfaces, enabling data from third parties to be used with the mapping service. It should be understood that the Web services layer can include any appropriate components known for receiving and processing Web service requests, as may include Web servers, routers, network infrastructure, and other such components. Further, although an Internet-based service layer is described, it should be understood that other such interface mechanisms can be used as well within the scope of the various embodiments. In this example, one or more third party content providers can use the APIs to inject POI data into the mapping service 608, such that a mapping application executing on a client device 602, 604 can include additional types of POI that might be of more interest to a user of those devices.

As a first example, one of the content providers is an information service 622 that provides a certain type of information that is stored in at least one information data store 624 or other such location. The information can include, for example, housing data, rental data, information about types of organizations or businesses (e.g., doctors, veterinarians, health clinics), or other location specific information. The information also can include information related to interests of the user, such as locations where movies were filmed, locations mentioned in song lyrics, locations where video games or books allegedly took place, and places where certain types of items can be obtained, among many other such options.

In one example, the mapping service might enable the information service 622 to provide information such as doctor locations, clinic locations, and the like, which might be automatically added to map data as POIs. In other embodiments, a user might be able to request certain types of POI from one or more providers. For example, if a user is interested in finding an apartment for rent, the user can select an option to have that type of data shown on a map. When the mapping service provides information for the map, the service can also provide rental information or POI obtained from a provider of that type of POI. In some embodiments, the mapping service can determine whether a user has an account with a provider, and if so can have that information automatically added to the map information. For example, if a user has an account with a service that provides housing prices for the user's real estate, that information might automatically be added to the map data. Similarly, if the user has an account with a social network, information from the social network can be obtained and used to provide POI on the maps displayed. These POIs can include, for example, friends' houses, places of work, favorite places to visit, etc. In some cases, the actual location of one or more friends (as may be determined by a location of their phone, for example) might also be displayed as a POI. Various other types of information can be displayed as well.

As another example, an electronic retailer 616, or provider of an electronic marketplace, can provide information about products purchased, viewed, or otherwise obtained by the user. If a user of the mapping service also has an account (or the same account) with an electronic retailer, as might be stored in a user data store 620, the mapping service can contact the electronic retailer for information about the user (assuming the user approves, allows, or enables the transfer of such information). For example, the electronic retailer will typically store information about items (products, services, downloads, etc.), in an item data store 618 or other such location, that the user has obtained, borrowed, viewed, or otherwise expressed interest. There might be a number of locations associated with those items that might be presented as POIs to the user. For example, a user buying a toy car might be interested in locations where the user could view the actual car. A user buying a book might be interested in where the book was written or allegedly took place. A user buying clothes of a particular designer might be interested in locations where a user can purchase clothes from that designer. A user who buys coffee drinks or comics might be interested in locations where a user can purchase those types of items. Various other types of location information related to items can be utilized as well within the scope of the various embodiments. The electronic retailer can determine the relevant data from at least one item data store 618, or other such location, to provide to the mapping service.

Figure 7:
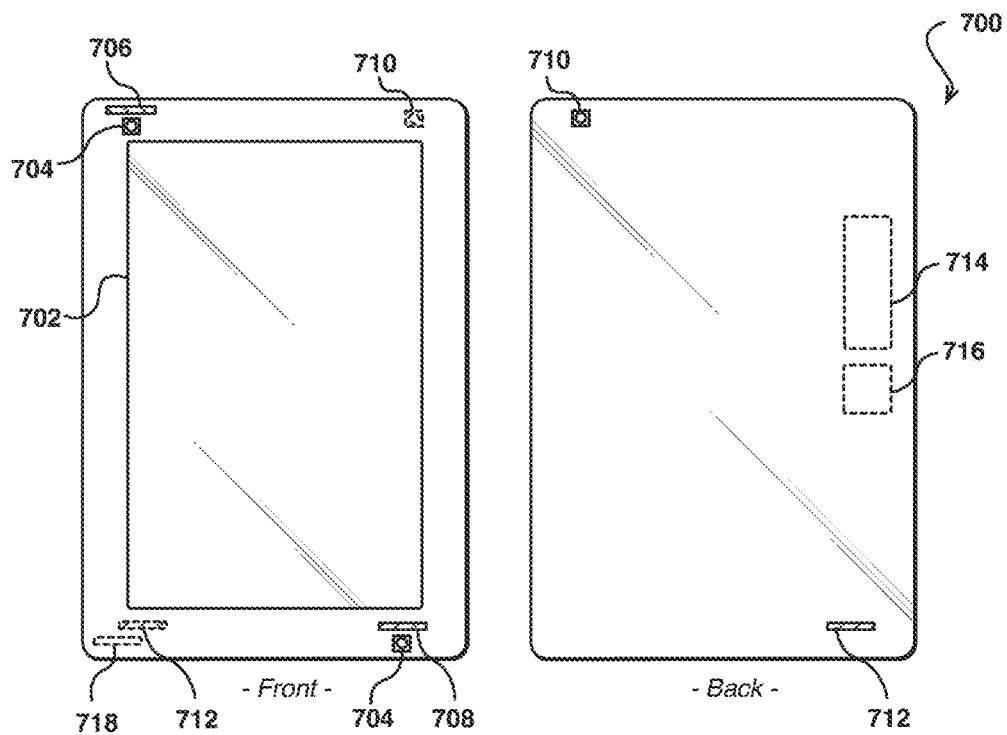
FIG. 7 illustrates front and back views of an example electronic computing device 700 that can be used in accordance with various embodiments.

FIG. 7 illustrates front and back views of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display element of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
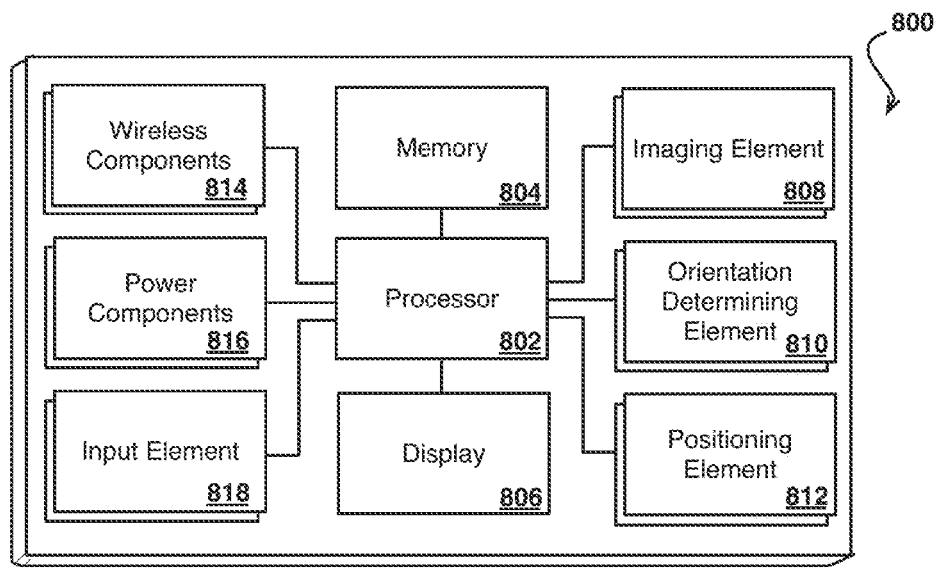
FIG. 8 illustrates a set of basic components of an electronic computing device such as the device described with respect to FIG. 7.

FIG. 8 illustrates a set of basic components of an electronic computing device 800 such as the device 700 described with respect to FIG. 7. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices.

The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system comprising:
   at least one processor; and
   a memory device including instructions that, when executed by the at least one processor, cause the at least one processor to:
   receive a request from a user of a mapping application executing on a client device;
   determine mapping data corresponding to at least one geographic region derived at least in part from information in the request, the mapping data including at least graphical information for rendering a map display for the at least one geographic region;

based at least in part upon the at least one geographic region, determine point of interest (POI) data associated with the mapping data, the POI data including one or more POIs;

analyze the request to identify a specified area of interest;

determine a value of a distance function based at least in part of the specified area of interest;

determine a ranking score of each POI in the POI data based at least in part on the distance function applied as a multiplier to a baseline score of the each POI within the specified area of interest;

select a portion of the POI data corresponding to a current view in the mapping application based at least in part upon the ranking score of the each POI of the POI data corresponding to the current view; and provide the portion of the POI data for display.

2. The system of claim 1, wherein the baseline score of each POI is determined based at least in part on a quantitative indication of similarity between one or more parameters included in the request, the quantitative indication of similarity comprising a real and non-negative numerical value, and the one or more parameters including at least one of at least one query keyword, a query constraint, the specified area of interest, or a location of a user.

3. The system of claim 1, wherein to determine the ranking score of each POI further causes the at least one processor to:

determine that the request includes the specified area of interest; and wherein determining the value of the distance function uses a logistic function, the logistic function using a constant value representing a maximum multiplier value for adjusting the baseline score, a first value that controls the logistic function generating a value of 1 at a specified distance, a second value representing a rate in which the constant value decreases to zero, and a geodesic distance between a first location of the each POI and second location within the specified area of interest, the second location comprising a center of the specified area of interest.

4. The system of claim 1, wherein to determine the ranking score of each POI further causes the at least one processor to:

determine that the request does not include the specified area of interest and includes the location of the user;

wherein determining the value of the distance function uses a logarithmic function, the logarithmic function using a natural logarithm applied to a constant value representing a maximum multiplier value for adjusting the baseline score, a first value representing a rate in which the constant value decreases to zero, and a geodesic distance between a first location of the each POI and the location of the user.

5. The system of claim 1, wherein selecting the portion of the POI data includes selecting one or more POIs within an area of interest included in the at least one geographic region.

6. A computer-implemented method comprising:

receiving a request for mapping information to be displayed to a user;

determining point of interest (POI) data associated with the mapping information, the POI data including one or more POIs;

analyzing the request to identify a specified area of interest;

determining a value of a distance function based at least in part on the specified area of interest;

determining a relevance score of each POI in the POI data based at least in part on the distance function as a multiplier to a baseline score of the each POI within the specified area of interest;

selecting a portion of the POI data based at least in part upon the relevance score of the each POI of the POI data; and providing the portion of the POI data for display with the mapping information.

7. The computer-implemented method of claim 6, wherein the request includes one or more parameters including at least one of at least one query keyword, a query constraint, the specified area of interest, or a location of a user.

8. The computer-implemented method of claim 6, wherein the baseline score of the each POI represents a quantitative indication of similarity between one or more parameters included in the request and the each POI, the quantitative indication of similarity comprising a non-negative numerical value.

9. The computer-implemented method of claim 6, wherein determining the relevance score of the each POI further comprises:

determining that the request includes the specified area of interest;

wherein determining the value of the distance function uses a logistic function.

10. The computer-implemented method of claim 9, wherein using the logistic function further comprises:

determining the value of the distance function based on a constant value representing a maximum multiplier value for adjusting the baseline score, a first value that controls the logistic function generating a value of 1 at a specified distance, a second value representing a rate in which the constant value decreases to zero, and a distance between a location of the each POI and a center of the specified area of interest.

11. The computer-implemented method of claim 6, further comprising:

determining that the request does not include the specified area of interest and includes a location of the user;

wherein determining the value of the distance function uses a logarithmic function.

12. The computer-implemented method of claim 11, wherein using the logarithmic function further comprises:

determining the value of the distance function based on a natural logarithm applied to a constant value representing a maximum multiplier value for adjusting the baseline score, a first value representing a rate in which the constant value decreases to zero, and a distance between a location of the each POI and the location of the user.

13. A non-transitory computer-readable medium including instructions stored therein that, when executed by at least one computing device, cause the at least one computing device to:

receive a request for mapping information to be displayed to a user;

determine point of interest (POI) data associated with the mapping information, the POI data including one or more POIs;

analyze the request to identify a specified area of interest;

determine a value of a distance function based at least in part on the specified area of interest;

determine a relevance score of each POI in the POI data based at least in part on the distance function applied as a multiplier to a baseline score of the each POI within the specified area of interest;

select a portion of the POI data based at least in part upon the relevance score of the each POI of the POI data; and provide the portion of the POI data for display with the mapping information.

14. The non-transitory computer-readable medium of claim 13, wherein the request includes one or more parameters including at least one of at least one query keyword, a query constraint, the specified area of interest, or a location of a user.

15. The non-transitory computer-readable medium of claim 13, wherein the baseline score of the each POI represents a quantitative indication of similarity between one or more parameters included in the request and the each POI, the quantitative indication of similarity comprising a non-negative numerical value.

16. The non-transitory computer-readable medium of claim 13, wherein the instructions further cause the at least one computing device to:

determine that the request includes the specified area of interest;

wherein determining the value of the distance function uses a logistic function.

17. The non-transitory computer-readable medium of claim 16, wherein the instructions further cause the at least one computing device to:

determine the value of the distance function based on a constant value representing a maximum multiplier value for adjusting the baseline score, a first value that controls the logistic function generating a value of 1 at a specified distance, a second value representing a rate in which the constant value decreases to zero, and a distance between a location of the each POI and a center of the specified area of interest.

18. The non-transitory computer-readable medium of claim 13, wherein the instructions further cause the at least one computing device to:

determine that the request does not include the specified area of interest and includes a location of the user;

wherein determining the value of the distance function uses a logarithmic function.

19. The non-transitory computer-readable medium of claim 18, wherein the instructions further cause the at least one computing device to:

determine the value of the distance function based on a natural logarithm applied to a constant value representing a maximum multiplier value for adjusting the baseline score, a first value representing a rate in which the constant value decreases to zero, and a distance between a location of the each POI and the location of the user.

20. The non-transitory computer-readable medium of claim 13, wherein to select the portion of the POI data includes selecting one or more POIs within an area of interest included in the request.

* * * * *